(12) United States Patent
Balachandran et al.

(10) Patent No.: US 7,701,909 B2
(45) Date of Patent: Apr. 20, 2010

(54) METHODS AND DEVICES FOR SELECTING SETS OF AVAILABLE SUB-CHANNELS

(75) Inventors: Krishna Balachandran, Morganville, NJ (US); Tingfang Ji, San Diego, CA (US); Joseph H. Kang, Belle Mead, NJ (US); Wei Luo, Piscataway, NJ (US); Hsuan-Jung Su, Taoyuan (TW)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1769 days.

(21) Appl. No.: 10/778,191

(22) Filed: Feb. 17, 2004

(65) Prior Publication Data

US 2005/0180374 A1 Aug. 18, 2005

(51) Int. Cl.
*H04B 7/216* (2006.01)
(52) U.S. Cl. ................... 370/335; 370/342; 375/260
(58) Field of Classification Search ............... 370/208, 370/210, 335, 342, 329; 375/146–147, 260, 375/135–136; 455/450, 452.1–452.2, 45
See application file for complete search history.

(56) References Cited

U.S. PATENT DOCUMENTS

| 6,351,500 | B2* | 2/2002 | Kumar ................. 375/270 |
| 2003/0137928 | A1* | 7/2003 | Kroeger et al. ........... 370/206 |
| 2004/0166886 | A1* | 8/2004 | Laroia et al. ............ 455/522 |
| 2004/0185813 | A1* | 9/2004 | Nagahama et al. ........ 455/139 |
| 2005/0025220 | A1* | 2/2005 | Laroia et al. ............ 375/132 |
| 2006/0160498 | A1* | 7/2006 | Sudo ..................... 455/103 |

* cited by examiner

*Primary Examiner*—Thai D Hoang
(74) *Attorney, Agent, or Firm*—John E. Curtin

(57) ABSTRACT

Information is transmitted over selected, Orthogonal Frequency Division Multiplexed (OFDM) sub-channels to avoid frequencies with unacceptable congestion, noise or interference levels. Using frequency hopping, selected non-contiguous OFDM sub-channels used for transmission may vary with time. Once a group of OFDM sub-channels is selected, a power level and modulation technique may also be selected based on channel quality.

20 Claims, 1 Drawing Sheet

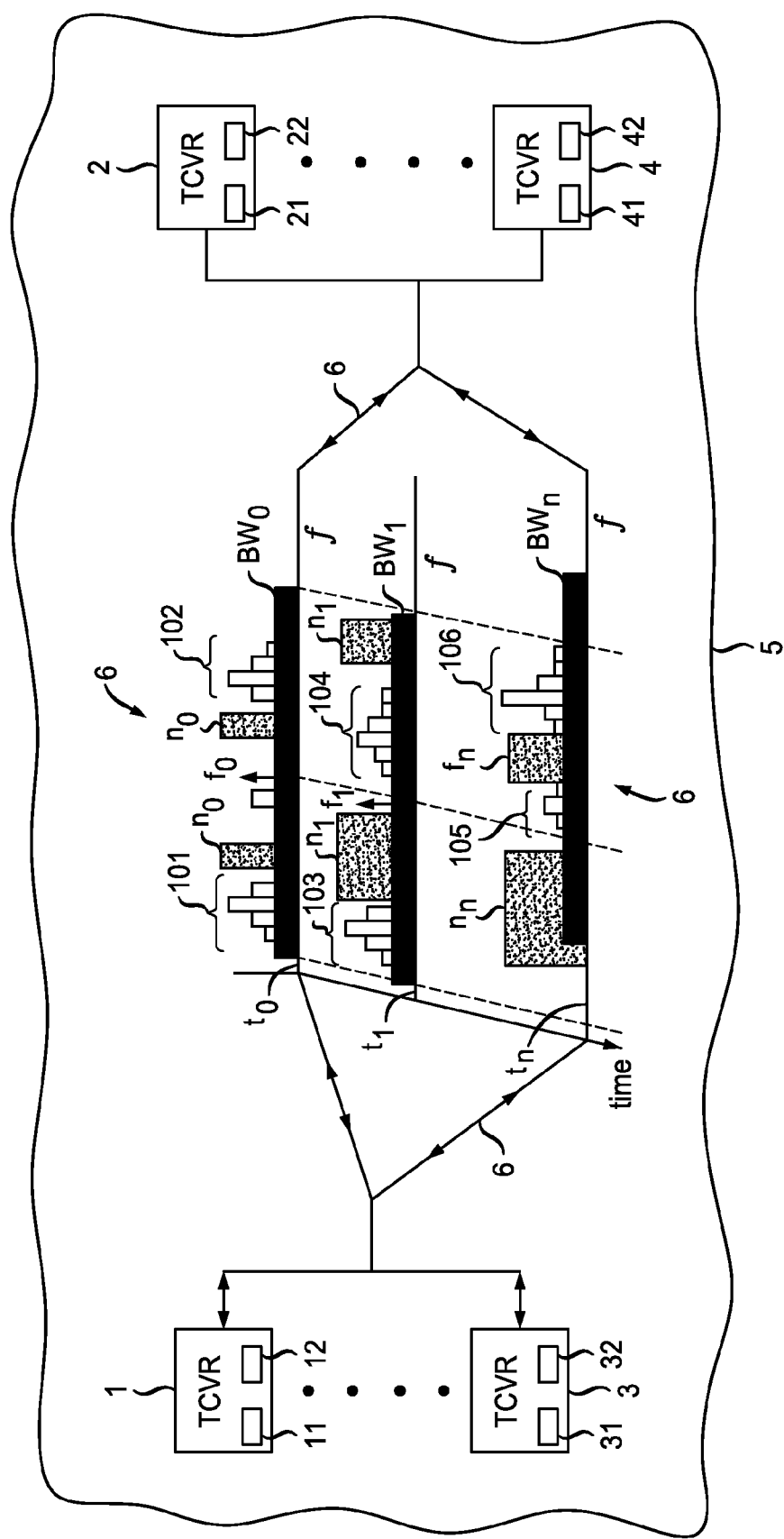

METHODS AND DEVICES FOR SELECTING SETS OF AVAILABLE SUB-CHANNELS

BACKGROUND OF THE INVENTION

Unlike the United States and other industrialized countries, many countries do not have an organized system which allocates frequency spectrum to specific applications, e.g., wireless communications. Without such an allocation system, anyone interested in setting up a communications system on a permanent or even temporary basis must first identify what frequency bands are available, i.e., which bands are uncongested or are associated with low noise levels, or are otherwise free from interference. In addition to determining which frequency bands are available, it is also necessary to determine the quality of any available channels. A low quality channel may require a different modulation scheme and power level in order to transmit a given amount of data compared to a higher quality channel.

In some countries there also exists internal military conflicts. This further complicates efforts to set up communications systems because not only may such countries lack an organized system for allocating frequency spectrum, but terrorists or anti-government groups also attempt to jam any frequency which may be used to transfer information, especially, when the communication system is a military or government system.

SUMMARY OF THE INVENTION

We have recognized that what is needed are methods and systems that are capable of identifying available frequency spectrum, and selecting an appropriate modulation scheme and power level for the available frequency spectrum based on the quality of the channels associated with the available frequency spectrum. This is achieved by first identifying and selecting an initial center frequency, e.g., bands used in 2G/3G wireless networks, GPS systems, military systems, etc. which may in fact be available or unavailable, and thereafter generating orthogonal frequency division multiplexed (OFDM) sub-channels at available frequencies centered around the initial center frequency. In other words, though an initial center frequency may be congested its OFDM sub-channels located at different frequencies than the center frequency may be free from congestion or interference and thus available to transmit information. As long as the sub-channels are available, it does not matter whether or not the initial center frequency is also available. In fact, the center frequency may actually be unavailable or jammed. Orthogonal frequency division multiplexing is used, among other reasons, to allow the use of a minimum amount of power in order to transmit data at a selected data rate. In accordance with an aspect of the present invention, modulation schemes and power levels are selected by a transceiver that employs an indication of the quality of each OFDM sub-channel. Based on the quality indication, the transceiver is operable to select an appropriate transmit power level and modulation technique for each OFDM sub-channel.

When an initial center frequency and its sub-channels are unavailable due to interference or congestion, transceivers of the present invention are further operable to select a next center frequency and associated OFDM sub-channels in real-time or at pre-determined times set beforehand if interference is expected. The next, selected sub-channels may be used to transmit information provided, of course, they are free from interference. Such frequency hopping reduces the effect of interference.

In yet a further embodiment of the invention, transceivers are operable to select a next modulation scheme and power level associated with these next center frequencies/sub-channels.

The sub-channels which are selected may be non-contiguous to, among other things, further ensure that the sub-channels selected by a transceiver are free from congestion.

BRIEF DESCRIPTION OF THE DRAWINGS

FIG. 1 depicts a simplified block diagram of transceivers according to embodiments of the present invention.

DETAILED DESCRIPTION OF THE INVENTION

Referring to FIG. 1, there is shown simplified block diagrams of transceivers 1-4 each of which may be used to carry out the features of the present invention, though, it should be understood that only one transceiver is needed to carry out most of the features of the present invention. The transceivers 1-4 are part of a wireless network 5 which may be located in an urban, country, commercial or military environment, to name just a few. To simplify the explanation of the features of the present invention, the following discussion will first focus on transceivers 1 and 2.

In between transceivers 1 and 2 there exists a wireless channel 6 over which is transmitted information from transceiver 1 to transceiver 2 and vice-versa.

FIG. 1 depicts signals which are being sent from transceiver 1 to transceiver 2 over different time periods, $t_0, t_1 \ldots t_n$, where $t_n$ represents a next time period. FIG. 1 also depicts a signal of bandwidth $BW_0$ employing OFDM signals. In one embodiment of the present invention, transceiver 1 is operable to transmit information over groups of OFDM sub-channels 101, 102 within the OFDM bandwidth or range of frequencies, $BW_0$, each group comprising of one or more sub-channels. The placement of the sub-channels within the OFDM bandwidth, $BW_0$, is determined by many things, one of which is a center frequency, $f_c$, shown as being centered at a frequency $f_o$ at time $t_0$. Present within the OFDM bandwidth, $BW_0$, is also noise, interference or unavailable spectrum denoted by $n_0$.

At some point in time, a user or operator of transceiver 1 needs to find a center frequency at which a signal of OFDM bandwidth, $BW_0$ will be realized. The center frequency can be chosen from among the entire range of frequencies over which the transceiver is capable of communicating, even from those frequencies that are unavailable. Techniques for detecting whether a center frequency is available or unavailable are varied. Generally, one technique involves detecting the presence or absence of existing transmissions. Another technique involves detecting the noise level at such a selected frequency. Regardless of the technique used, a selected center frequency is considered to be unavailable, for example, if existing transmissions are occurring at the selected frequency or if the detected noise level is too high. That said, though a center frequency may be unavailable, it may still be used as long as its associated sub-channels are available.

Though certain sub-channel frequencies may be known beforehand to be unavailable, the transceiver 1 is operable to select available sub-channel frequencies regardless of whether such knowledge is known or not. At time $t_0$, transceiver 1 is operable to select a set of available sub-channel frequencies in real-time. In a further embodiment of the present invention, the OFDM bandwidth $BW_0$ centered at the center frequency $f_0$ shown in FIG. 1 as the initial center frequency may not be contiguous to OFDM bands associated with a prior set of center frequencies.

After center frequency $f_0$ is selected, transceiver 1 is further operable to generate initial OFDM sub-channel groups 101, 102 at available frequencies determined by a frequency band which is centered at the selected initial frequency $f_0$. Note that sub-channel groups 101,102 need not be contiguous to each other.

The ability to select a set of center frequencies and available associated sub-channels provides transceivers (or other devices) operating using features of the present invention with the ability to solve problems associated with congestion or interference. If the transceiver 1 selects a center frequency whose sub-channels exhibit unacceptable levels of noise and/or interference within OFDM bandwidth $BW_0$, then transceiver 1 is operable to continue to select an alternate center frequency with associated sub-channels within OFDM bandwidth $BW_0$ that have acceptable levels of interference and/or noise. As noted above, the center frequency ultimately selected may be within an unavailable frequency as long as its associated sub-channels are located within otherwise available frequencies different from the center frequency.

Because the condition of a given channel affects different transmission frequencies differently, it may be necessary to use a different power level and/or modulation scheme to transmit information via sub-channel group 101 than is used via sub-channel group 102. In a further embodiment of the present invention, transceiver 1 receives an indication of the quality of each sub-channel group 101,102 from transceiver 2. That is, after transceiver 1 sends information to transceiver 2, transceiver 2 is operable to return an indication of the quality of each sub-channel group (i.e., quality of the signal sent on a sub-channel group as it traverses the channel 6) to transceiver 1. In yet a further embodiment, transceiver 2 is operable to return indications of the quality of all possible sub-channels across the OFDM band, including those that are not used for transmission. In yet a further embodiment, transceiver 2 is operable to return indications of the quality of all possible sub-channels across the full range of frequencies, including those that are not used for transmission. These channel quality indicators can be used to determine the quality of each sub-channel group. Upon reception or determination of this channel quality indication, transceiver 1 is further operable to transmit information using an initial modulation technique at an initial power level over the OFDM sub-channel group associated with the indication. In this way, the transceiver 1 is capable of determining the modulation technique and power level which should be used for a given sub-channel group 101,102 based on real-time channel conditions. The channel quality indication may also be used to dynamically change the sub-channel groups employed for transmission within the OFDM band based on prevailing channel conditions. As will be recognized by those skilled in the art, the channel quality indicator may represent an interference signal-to-noise level or signal-to-interference ratio or the like. This indicator will dictate the sub-channel group(s), the initial modulation technique and power level that will be used by transceiver 1 to transmit information to transceiver 2. Thus, at time $t_0$, transceiver 1 may transmit information over each of its sub-channel groups 101,102 using different modulation techniques and power levels determined by the channel conditions at time $t_0$.

Having just indicated that different modulation techniques may be used, it should be understood that nothing restricts or limits transceiver 1 from transmitting information using the same modulation technique over each of the sub-channel groups 101,102. In this specific situation the term "different" may be interpreted as a second, yet the same, technique.

It should be further understood that the power levels and modulation techniques selected by transceiver 1 are selected in order to maximize the amount of information that can be transmitted from transceiver 1 to transceiver 2. In a further embodiment of the present invention, transceiver 1 is operable to transmit information over sub-channel group 102 at substantially the same time as information is being transmitted over sub-channel group 101.

The benefits provided by the features described above are as follows. First, the novel techniques proposed here are capable of selecting frequencies that have acceptable congestion, interference or noise levels. Second, these techniques also make it difficult for someone to intercept transmitted information because more than one modulation scheme may be used and the information may be communicated across a wide range of frequencies.

Before going further, a practical application of the present invention will be described briefly. Suppose it is necessary to set up a communication link in a country which does not have an established or organized frequency allocation program. Upon arriving in such a country, equipment using features of the present invention would be able to detect an available band of frequencies and select an appropriate power level and modulation scheme.

FIG. 1 also shows a next pair of transceivers 3,4. It should be understood that although only two sets of transceivers 1,2 and 3,4 are shown, the present invention may be applied to any number of transceiver sets. In certain circumstances it may be advantageous, or even required, that more than one set of transceivers be used. For example, a second set of transceivers 3,4 may be used as a backup system if an initial set of transceivers 1,2 fails. Alternatively, if the amount of information needed to be transmitted over a given time period is high enough, more than one set of transceivers may be required (e.g., multiple transceivers residing in a single communication node). In yet another embodiment, transceivers may reside within communication nodes in an ad hoc network. In any case, the use of more than one set of transceivers, each of which may use multiple, different modulation techniques, would make it more difficult for an adversary to jam, interfere, decode or otherwise intercept information being transmitted.

With the above thoughts in mind and without any loss of generality, the present invention envisions the use of a second set of transceivers capable of operating in the same way as the first set of transceivers 1,2 explained above. For clarity's sake, the set of center frequencies, sub-channels, modulation techniques and power levels will be referred to as "first" when referring to transceivers 1,2 or "second" when referring to transceivers 3,4.

All of the above may occur at time period $t_0$.

In a further embodiment of the present invention, transceivers 1-4 may be operable to carry out frequency hopping. That is, as time passes from $t_0$ to $t_1$ and on to $t_n$, transceivers operating according to the present invention are capable of selecting different sets of center frequencies. Frequency hopping provides fading diversity, interferer diversity and interference averaging benefits (i.e., to reduce the perceived interference within a sub-channel over time). Each of the transceivers 1-4 is operable to carry out frequency hopping in real-time if and when an initial center frequency and its sub-channels become unavailable or at a pre-determined time if such interference is expected. The frequency hopping may be random or may be carried out using a pre-determined sequence of frequencies.

Referring back to FIG. 1, at time $t_1$, it can be seen that the center frequency $f_c$ has changed from $f_0$ to $f_1$. Similarly, between time $t_1$ and time $t_n$, the center frequency $f_c$ has changed from $f_1$ to $f_n$. As before, note that the center frequency itself can lie within an unavailable region of the spectrum as shown at time $t_n$. The ability to change center frequencies from $f_0$ to $f_1$ to $f_n$ as time passes is referred to as "frequency hopping". As can be seen again from FIG. 1, each time the value of the center frequency $f_c$ changes, so do the values of the sub-channels. In effect, sub-channel groups 103,104 are located at different frequencies than sub-channel groups 101,102. Similarly, sub-channel groups 105,106 at time $t_n$ are located at different frequencies that sub-channel groups 103,104 at time $t_1$.

Chronologically, the center frequency $f_1$ will be referred to as a "next," center frequency. Similarly, sub-channel groups 103,104 are referred to as "next" OFDM sub-channel groups.

Once transceiver 1 has generated a new center frequency $f_1$ and new sub-channel groups 103,104, it is operable to act in a similar manner as described during time $t_0$. That is, transceiver 1 is operable to select a modulation technique and power level for each sub-channel group 103,104 in accordance with an indicator received from transceiver 2 at time $t_1$ or slightly before. As before, the modulation techniques and power levels used to transmit information contained with sub-channel groups 103,104 may differ from sub-channel group to sub-channel group or, if appropriate, may remain the same. In another case, whether at $t_0$, $t_1$ or $t_n$ the modulation techniques and power levels are selected in order to maximize the amount of information which can be transmitted. Alternatively, modulation and minimum power levels can be chosen to transmit at a desired rate.

The discussion above has focused on the transmission side of the present invention. As indicated briefly above, the present invention also involves the reception of information and signals as well. Embodiments of the present invention include transceivers 2,4 which are capable of detecting a channel quality for each non-contiguous, OFDM sub-channel group in real-time. Once a sub-channel group's quality is detected, transceivers 2,4 are operable to send quality indicators to transceivers 1,3.

After these indicators have been sent to transceivers 1,3, transceivers 2,4 are operable to receive information via the sub-channel groups using a particular modulation technique at a particular power level. More specifically, transceivers 2,4 are operable to receive information and to demodulate such information using demodulation techniques which complement the modulation technique used by transceivers 1,3 to transmit information.

The above discussion has presented some examples of the present invention. Other examples and modifications are possible. For example, the functions of selecting a center frequency, generating sub-channels, selecting a modulation technique or power level may be carried out by a sub-component of a given transceiver such as one or more selectors 11, 21, 31, 41, or one or more generators 12, 22, 32, 42 shown in FIG. 1.

Because it is next to impossible to set forth all of the examples falling within the scope of the present invention, the scope of the present invention may be better determined by the claims which follow.

We claim:

1. A transceiver for:
    selecting an initial center frequency from among a range of frequencies, where the selected initial frequency is an unavailable frequency; and
    generating initial orthogonal frequency division multiplexed (OFDM) sub-channels at available subchannel frequencies different from the center frequency within a frequency band centered at the selected initial center frequency.

2. The transceiver as in claim 1 for further selecting an initial modulation technique and an initial power level for transmitting information over one of the initial OFDM sub-channels.

3. The transceiver as in claim 2 wherein the transceiver further:
    selects a next center frequency from among a range of frequencies, where the selected next center frequency is an unavailable frequency;
    generates next OFDM sub-channels at available subchannel frequencies different from the next center frequency within a frequency band centered at the next center frequency; and
    selects a next modulation technique and a next power level for transmitting information over one of the next OFDM sub-channels.

4. The transceiver as in claim 2, wherein the transceiver further:
    receives an indication of the quality of each initial and next OFDM sub-channel;
    selects the transmit power level for each OFDM sub-channel based on the indicated quality; and
    selects the modulation technique for each OFDM sub-channel based on the indicated quality and selected power level.

5. The transceiver as in claim 1 wherein the available subchannel frequencies are non-contiguous.

6. A method for selecting sets of available sub-channels comprising the steps of:
    selecting an initial center frequency from among a range of frequencies where the selected initial center frequency is an unavailable frequency; and
    automatically generating initial orthogonal frequency division multiplexed (OFDM) sub-channels at available subchannel frequencies different from the center frequency within a frequency band centered at the selected initial center frequency.

7. The method as in claim 6 further comprising the step of selecting an initial modulation technique and an initial power level for transmitting information over one of the initial OFDM sub-channels.

8. The method as in claim 7 further comprising the steps of:
    selecting a next center frequency from among a range of frequencies where the selected next center frequency is an unavailable frequency;
    automatically generating next OFDM sub-channels at available subchannel frequencies different from the next center frequency within a frequency band centered at the next center frequency; and
    selecting a next modulation technique at a next power level for transmitting information.

9. The method as in claim 7, further comprising the steps of:
    receiving an indication of the quality of each initial and next OFDM sub-channel;
    selecting the transmit power level for each OFDM sub-channel based on the indicated quality; and
    selecting the modulation technique for each OFDM sub-channel based on the indicated quality at the selected power level.

10. The method as in claim 6 wherein the available sub-channel frequencies are non-contiguous.

11. A transceiver for selecting sets of available sub-channels comprising:
    means for selecting an initial center frequency from among a range of frequencies, where the selected initial center frequency is an unavailable frequency; and
    means for generating initial orthogonal frequency division multiplexed (OFDM) sub-channels at available sub-channel frequencies different from the center frequency within a frequency band centered at the selected initial center frequency.

12. The transceiver as in claim 11 further comprising means for selecting an initial modulation technique and an initial power level for transmitting information over one of the initial OFDM sub-channels.

13. The transceiver as in claim 12 further comprising:
means for selecting a next center frequency from among a range of frequencies, where the selected initial center frequency is an unavailable frequency;
means for generating next OFDM sub-channels at available subchannel frequencies different from the next center frequency within a frequency band centered at the next center frequency; and
means for selecting a next modulation technique and a next power level for transmitting information over one of the next OFDM sub-channels.

14. The transceiver as in claim 12, further comprising:
means for receiving an indication of the quality of each initial and next OFDM sub-channel;
means for selecting the transmit power level for each OFDM sub-channel based on the indicated quality; and
means for selecting the modulation technique for each OFDM sub-channel based on the indicated quality and the selected power level.

15. The transceiver as in claim 11 wherein the available subchannel frequencies are non-contiguous.

16. A transceiver for selecting sets of available sub-channels comprising:
a selector for selecting an initial center frequency from among a range of frequencies, where the selected initial center frequency is an unavailable frequency; and
a generator for generating initial orthogonal frequency division multiplexed (OFDM) sub-channels at available subchannel frequencies different from the center frequency within a frequency band centered at the selected initial center frequency.

17. The transceiver as in claim 16 wherein the selector further selects an initial modulation technique and an initial power level for transmitting information over one of the initial OFDM sub-channels.

18. The transceiver as in claim 17 wherein:
the selector further selects a next center frequency from among a range of frequencies, where the selected next center frequency may be an unavailable frequency;
the generator further generates next OFDM sub-channels at available subchannel frequencies different from the next center frequency within a frequency band centered at the next center frequency; and
the selector further selects a next modulation technique and a next power level for transmitting information over one of the next OFDM sub-channels.

19. The transceiver as in claim 17, further comprising:
a receiver for receiving an indication of the quality of each initial and next OFDM sub-channel;
a receiving selector for selecting the transmit power level for each OFDM sub-channel based on the indicated quality and select the modulation technique for each OFDM sub-channel based on the indicated quality and selected power level.

20. The transceiver as in claim 16 wherein the available subchannel frequencies are non-contiguous.

* * * * *